J. G. Barker,
Cheese Cutter.
Nº 29,559.          Patented Aug. 14, 1860.
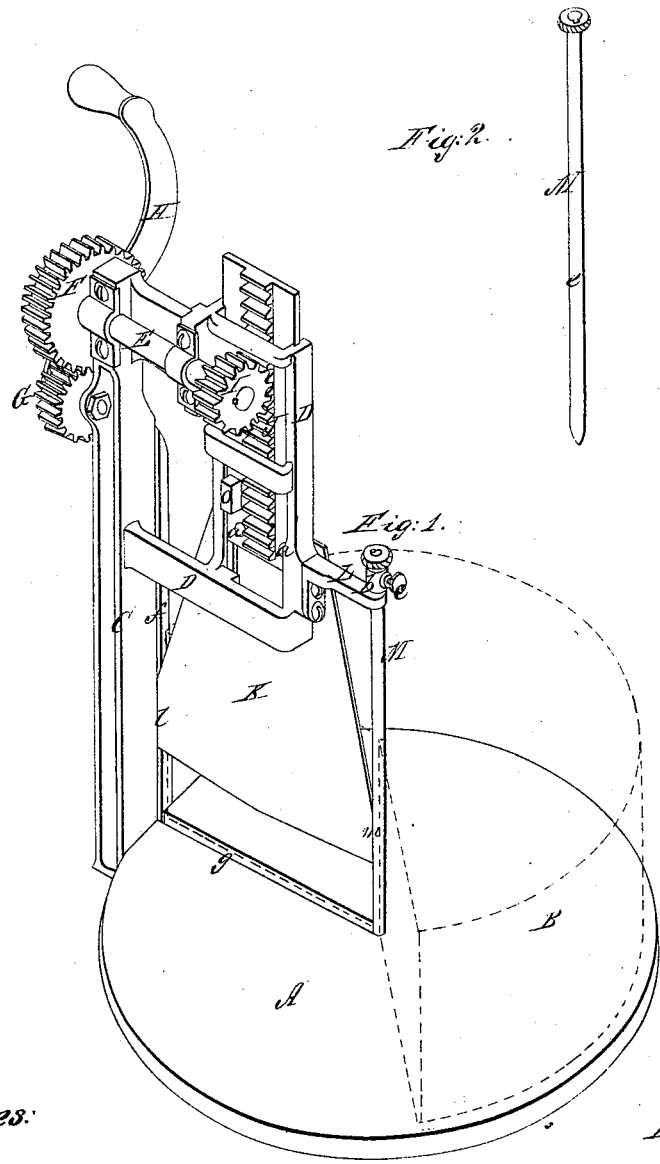
Witnesses:
Thos R. Roach
R. H. Cooper
Inventor.
J. G. Barker

UNITED STATES PATENT OFFICE.

J. G. BARKER, OF WATERTOWN, MASSACHUSETTS.

CHEESE-CUTTER.

Specification of Letters Patent No. 29,559, dated August 14, 1860.

*To all whom it may concern:*

Be it known that I, J. G. BARKER, of Watertown, in the county of Middlesex and State of Massachusetts, have invented an Improved Cheese-Cutter, of which the following is a full, clear, and exact description, reference being had to the accompanying drawings, making part of this specification, in which—

Figure 1 is a perspective view of my improved machine, a portion of a cheese being represented in red; Fig. 2 a view of the guide rod which I employ.

The object of my present invention is to produce a convenient machine for cutting wedge-shaped slices from a cheese without breaking the cheese and with the expenditure of a small amount of hand power.

I am aware that a machine for cutting cheese has been patented by De Witt Stevens June 7, 1859, but in said machine the knife being supported on one side only required considerable thickness to give it the proper strength and rigidity; and as its edge was square or at right angles to the line of cut, it required considerable power to force it through the cheese, and the cloth which usually covers the cheese.

The first part of my invention consists in supporting the knife on both sides (one side being supported in a groove in the frame and the other side in a groove in a pin which passes down through the center of the cheese), by which I am enabled to use a much thinner knife, which is less liable to break the cheese.

The second part of my invention consists in the employment of a knife having its edge inclined to the path or cut of the knife, and of a groove in the table on which the cheese is placed, to receive the knife, whereby less power is required to force the knife through the cheese, and the edge of the knife by passing down below the surface of the table on which the cheese is placed is sure to cut entirely through the skin or covering of the cheese, which it would not do with the same certainty if the knife merely cut down onto the table.

That others skilled in the art may understand and use my invention I will proceed to describe the manner in which I have carried out the same.

In the said drawings A is a circular table on which the cheese B is placed, a standard C rises from one side of this table and has a frame D projecting from it, in a plane passing through the center of the table.

A horizontal shaft E, supported in suitable bearings in the standard C and frame D, carries at one end a cog wheel F which engages with a pinion G, to which the crank H is applied, and at its other end a pinion I which engages with a rack J sliding in suitable grooves or ways in the frame D.

The knife K is attached by rivets *a* to the rack J, so that as the crank H is turned the rack and knife will be raised or lowered vertically.

An arm L projects from the frame D over the center of the table A. It has a socket *b* on its outer end through which passes a rod M, (detached in Fig. 2,) furnished with a groove *e* which extends the whole length of the rod, the lower end of this rod enters a socket or recess in the center of the table A, and is pointed so that it may be thrust through the center of the cheese, the cheese being turned around it as the slicing proceeds.

A set screw *c*, which passes through the socket *b*, secures the rod M in position. A groove *f* is cut in the standard C parallel with the groove in the rod M. A radial groove *g* is cut in the table A from its center to its periphery where the groove *f* touches it, and immediately beneath the path of the knife K.

The knife K is made of sheet metal of the form shown in Fig. 1, with its cutting edge *i* having two bevels or inclines from its center toward each side (or it may be inclined from one side to the other). One side or corner *l* of the knife slides in the groove *f* and the other corner in the groove *e* of the rod M. A stop *o* on the face of the rack J strikes the frame D and prevents the knife K from cutting through the table A.

What I claim as my invention, and desire to secure by Letters Patent, is—

The above described cheese cutter, having its knife K guided by the grooved rod M and operating in the manner substantially as described.

J. G. BARKER.

Witnesses:
THOS. R. ROACH,
R. H. COOPER.